Feb. 5, 1946.   A. H. SCHUTTE ET AL   2,394,016
CENTRIFUGAL SEPARATION
Original Filed May 10, 1943
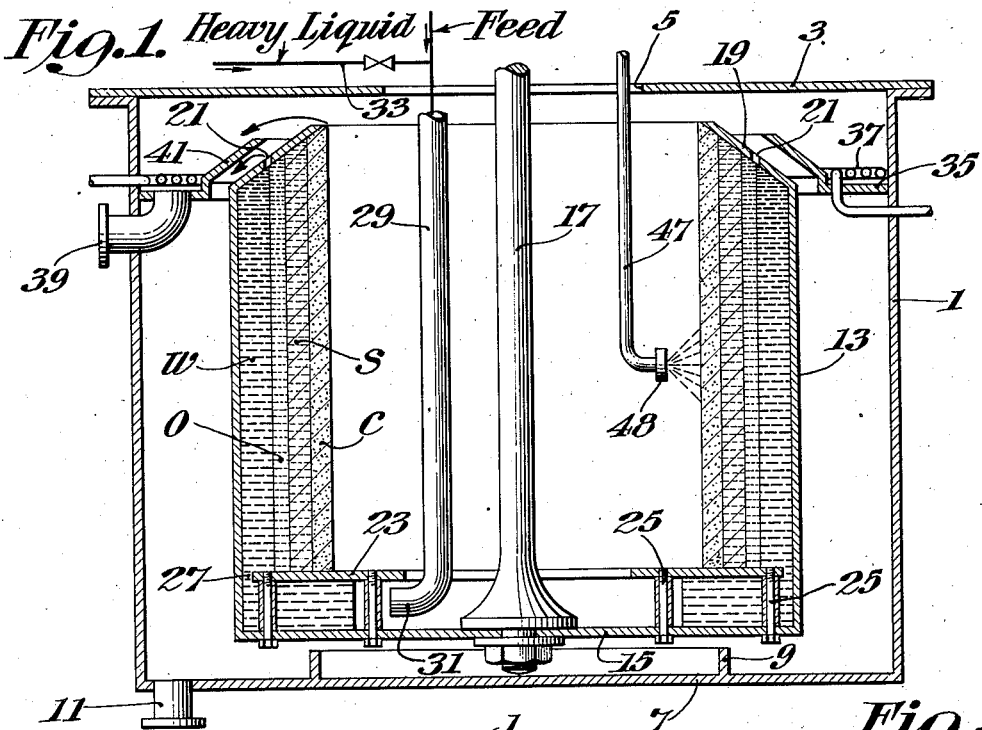
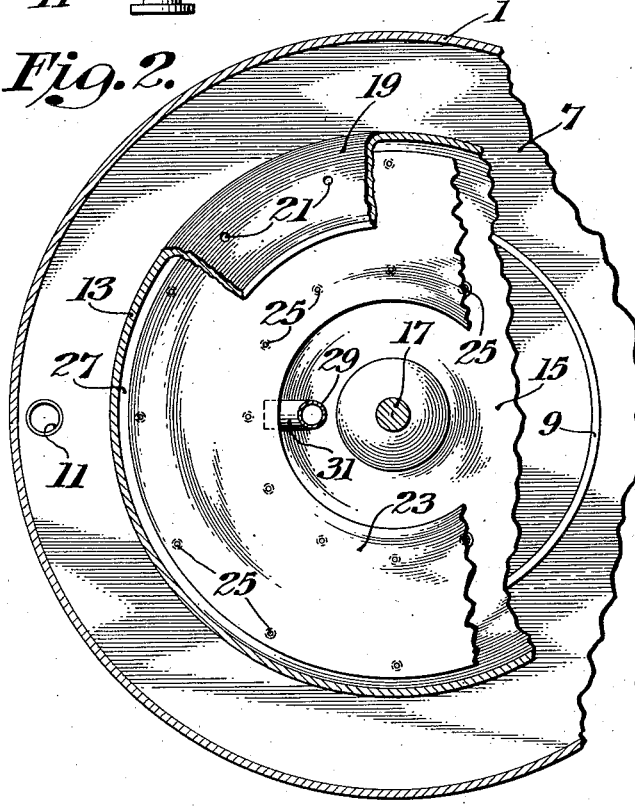
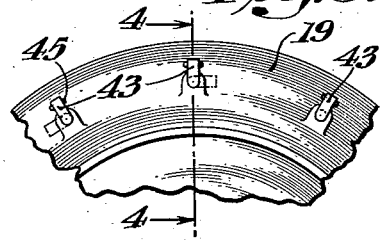
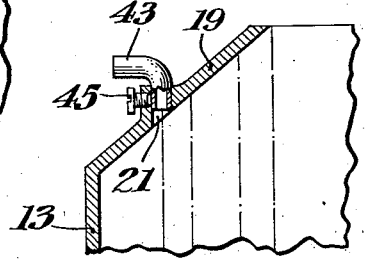
INVENTORS
August Henry Schutte
and Arthur W. Mack
BY Rolf E. Schneider
AGENT Patented Feb. 5, 1946

2,394,016

UNITED STATES PATENT OFFICE 2,394,016

CENTRIFUGAL SEPARATION

August Henry Schutte, Hastings on Hudson, N. Y., and Arthur W. Mack, Bayonne, N. J.

Original application May 10, 1943, Serial No. 486,330. Divided and this application August 31, 1943, Serial No. 500,600

7 Claims. (Cl. 196—18)

This invention relates to an improved method for continuously separating liquids from solids by centrifuging an emulsion of such materials and, more particularly, the invention pertains to the separation of substantially wax-free oil and oil-free wax from oil-wax emulsions of the general type disclosed and claimed in a prior patent to A. H. Schutte, No. 2,168,306, issued August 1, 1939. This application is a division of our copending application, S. N. 486,330, filed May 10, 1943.

In this prior patent, No. 2,168,306, there are described the difficulties encountered in separating materials such as oil in an oil-wax mixture and a novel manner of solving this problem so that commercial scale wax can be effectively separated from an oil-wax mixture. This is accomplished by emulsifying the oil-wax mixture with a third material that is immiscible with and a non-solvent for the oil-wax mixture. The emulsification of such materials makes it possible to obtain a dispersed phase of one of the constituent materials in the immiscible, non-solvent material which is usually water. If such an emulsion is chilled or cooled down below the melting point of the wax, the dispersed material is restored to its solid state and the liquid components of the emulsion can then be removed by centrifugal force. Oil-wax mixtures are particularly adaptable to this treatment; and in the separation of an emulsion thereof the relatively dense liquid portion of the emulsion is uniformly removed from the relatively light and porous wax cake. The present invention is an improvement over this basic concept disclosed in the above prior patent whereby an accelerated settling due to centrifugal force is created.

An object of this invention is the formation of separate layers of dry wax cake, submerged wax cake, oil and water within a suitable centrifugal apparatus and the removal of the liquid constituents together with the discharge of the wax cake from the apparatus, the wax cake being lighter than the heaviest liquid component.

A further object of the invention is the control of such a separation process whereby the discharge of oil and water from the apparatus may be adjusted with a great degree of accuracy. This control is accomplished by regulating the feed rate of emulsion to the machine and by the addition of a desired amount of immiscible non-solvent liquid to the emulsion feed line.

In the accompanying drawing we have disclosed one form of apparatus for carrying out this novel method of operation but it will be understood that any equivalent apparatus capable of carrying out the objects of the invention will fall within the purview of this method of separating liquid-solid mixtures and that the apparatus may be arranged on its horizontal axis as distinguished from its vertical axis as disclosed.

In the drawing:

Fig. 1 is a substantially vertical cross-section of an apparatus capable of carrying out the separatory method illustrating the emulsion and additive non-solvent feeds and the stratified layers assumed by the separated materials;

Fig. 2 is a fragmental broken away plan view of the apparatus showing the inlet feed and liquid discharge openings; and Figs. 3 and 4 are fragmental views of a modification of the liquid discharge passages of the centrifuge.

In the preferred embodiment of our invention we have disclosed in the accompanying figures of the drawing a diagrammatic representation of a centrifugal settling apparatus having an outer cylindrical casing 1 provided with a top 3 having an opening 5 therein. The lower end of the casing 1 extends inwardly at 7 to provide a bottom liquid collection trough defined by the casing wall 1 and the vertical annular flange 9. A drain-off fitting 11 is connected to the trough or channel 7. A solid-wall, cylindrical, rotating bowl or basket 13, having a closed lower end 15, is suspended on and receives rotation from a vertical shaft 17 and, through the medium of this shaft, the solid-wall separatory bowl is rotated at any desired speed. The upper open end of the bowl is provided with an inwardly extending oblique flange or cone portion 19 having a plurality of circumferentially arranged, spaced openings or orifices 21 therein whereby the liquid constituents separated from the emulsion are discharged. In the lower end of the bowl is an annular platform or baffle 23 that is held in raised position above the bottom wall 15 of the basket 13 by means of screw spacers 25. This lower platform or distributing baffle 23 is of such a size that the outer periphery is slightly spaced from the inner wall of the bowl 13 whereby a passage 27 is created between the baffle 23 and the wall of the centrifuge basket.

Emulsified material to be separated, such as an oil-wax emulsion, is fed into the apparatus through a vertical feed pipe 29 which may have a lower curved discharge part 31 extending under the inner and lower edge of the feed-distributing baffle 23. The feed pipe 29 is connected to a source of emulsion such as an emulsifying apparatus disclosed in the prior patent, No. 2,168,306, whereby a cooled or chilled emulsion of wax and oil is discharged from the lower end of the pipe 31 beneath the baffle 23. In addition, the feed pipe 29 is connected to a source of suitable, heavy, non-solvent liquid such as water or previously separated filtrate through supply line 33.

In operation, the bowl 13 is rotated and emulsion is discharged under the distributing baffle 23. Due to centrifugal force the material flows radially outwardly and, thence, upwardly between the outer edge of the baffle and the wall of the basket through throat 27. Under accelerated settling due to the centrifugal force, the material in the upper or main portion of the basket 13 separates or stratifies into distinct layers of water, oil, soggy or submerged cake, and dry, porous cake indicated in the drawing by the letters "W," "O," "S" and "C," respectively. The light cake C and its submerged portion S float on the oil layer O by buoyancy, while the heavier water layer W lies adjacent the inner wall of the bowl 13.

The liquid layers of water and oil are discharged from the upper part of the bowl through the plurality of spaced openings 21 formed in the cone shaped lip 19 of the basket. The oil capacity of these perforations or orifices may be adjusted to operating conditions so that the discharge rates of water and oil therethrough are such that there is a layer of clear oil between the water layer and the submerged cake layer as the water and clear oil layers are continuously ejected during the operation of the machine. The relative position of the oil and water layers with respect to the discharge openings 21 is minutely regulated by adjusting the feed rate of emulsion to the machine and by the addition of a heavy non-solvent liquid such as water or previously separated filtrate into the feed line 29 through the line 33. Thus, the number and size of the discharge openings 21 give the operator a gross or coarse adjustment of the discharge rate of oil and water, and the amount of additional water or other non-solvent liquid added to the emulsion fed through line 33 gives the operator a fine or vernier adjustment of this discharge rate.

Initially, the operator starts up the apparatus using a slightly greater total discharge opening than is required for the desired operation and thereafter increases the feed rate to the machine until a further increase would give an insufficiently drained cake due to lowering of the cake residence time. Following this, sufficient non-solvent is added through connection 33 to secure a clear filtrate liquid discharge containing substantially no solid particles. As the non-solvent liquid is added at an increasing rate, more of the area of the exit opening is occupied by non-solvent and the oil therefore builds up a head to permit its egress through the remaining exit opening area. This action forces the submerged cake layers in toward the axis of the separator bowl until a clear oil layer is established. A further increase in non-solvent flow merely decreases the thickness of the dry cake C, and the operator may thus adjust the dry cake thickness by adjusting the flow of the liquid through line 33. It should be understood that the same effect and control of the apparatus may be obtained by introducing filtrate oil at 33 instead of a non-solvent liquid although the use of non-solvent is usually preferred where the material to be separated is emulsified.

While the apparatus herein described is capable of operation without the addition of a non-solvent liquid into the emulsion feed line, practical difficulties of control may arise without this feature, such as the proper spacing and size of the discharge orifices. However, in an apparatus provided with the additional non-solvent liquid feed line 33 the percentage of the capacity of the perforations 21 which is taken up by the non-solvent liquid is easily and precisely controlled and this, in turn, gives the operator control of the remaining capacity of these exit perforations for the oil component of the filtrate.

After the machine has been in operation and a sufficient thickness of wax cake C has been built up, the emulsion feed can be continued so that the inner portion of the cake will build up beyond the edge of the annular cone lip 19, and, due to the resultant forces created, discharge continuously and at an essentially constant rate over the lip into the annular trough 35 provided in the upper portion of the outer casing 1. It is preferable to heat this trough by means of a coil 37 whereby the separated wax cake may be readily discharged through fitting 39.

However, the wax cake may be discharged by continuing the normal feed of the emulsion and increasing the amount of non-solvent liquid introduced into the feed. This results in a comparatively thick annular water layer W being built up adjacent the inner wall of the casing 13 of such amount as to be beyond the discharge capacity of the openings 21 whereby the cake C is forced inwardly beyond the inner edge of the cone 19 and is discharged at an intermittently varying rate over the lip and into the trough 35.

As shown by the arrow, the separated water and clear oil layers W and O leave the bowl through the discharge openings 21 positioned in the cone 19 and are directed against the underside of annular baffle 41 and collected in the trough 7. The filtrate passes through fitting 11 to a suitable settling tank or the like.

The action of these discharge holes 21 is radically different from the prior art wherein side openings in the vertical bowl have been suggested. It should be understood that these upper cone openings do not act as a filter medium but rather as exits for clarified filtrate as described above. The operation of the apparatus is so controlled that the submerged and dry cake is kept away from the zone of these top discharge openings.

Excellent results have been obtained in the separation of wax-oil emulsions on such an improved centrifugal separator having a 10-inch basket 13 provided with eight $\frac{1}{16}$-inch openings 21 in the annular lip 19. One particular slack wax charge having a melting point of 110° F. was emulsified, and the emulsion was separated on the above machine to produce a wax cake having a melting point of 116.5° F. and a foots oil filtrate having a melting point of 85° F. The yield of cake was 80%, and the yield of filtrate was 20%. The oil content of the slack wax was 20%, of the wax cake 8.9%, and of the filtrate 45.2%. The rate of feed was about 7 gallons per hour, and the basket was rotated at 1,900 R. P. M. This operation met the requirements of reducing the oil content of the wax charge by one-half and of producing a foots oil having a melting point of 85° F. These requirements were met in one pass of the wax through our improved centrifuge whereas the prior art centrifuges required two or more passes to produce the same results.

As already pointed out, the addition of non-solvent liquid through line 33 for control of the separation is the most desirable manner of operation. Such liquid preferably has the same temperature as the incoming charge. This control, however, may also be accomplished through the medium of washing the cake with a suitable wash liquid such as the non-solvent liquid. In such event, the wash liquid is introduced through pipe 47 provided with the spray nozzle 48, which directs such wash liquid against the cake C intermediate the ends of the centrifuge. Since the primary function of the wash liquid is to remove retained oil and low-melting waxes from the cake, its temperature is higher than the charge temperature.

An increase in the temperature of the non-solvent liquid used in the formation of the emulsion also accomplishes the above control since more liquid is then required to produce the desired degree of cooling of the resulting emulsion. Either of these alternative methods of control may be used alone, but they are preferably used in conjunction with the introduction of non-solvent liquid through line 33.

The number of discharge openings and the size thereof depend to some extent on the separation being made. They should be neither too small so as to plug up or too large so as to discharge wax along with the oil and non-solvent liquid. Similarly, the number of openings should be just sufficient to insure continuous discharge of the filtrate and will vary to some extent with the speed of rotation of the basket. These openings should be spaced sufficiently from the wall of basket 13 and from the inner edge of lip 19 so that a water layer can be built up along the basket wall and so that an effective amount of dry cake can be produced, respectively. Although we have shown inwardly extending annular lip 19 containing openings 21 as cone-shaped, it may also be flat (in a plane transverse to the axis of rotation) if so desired.

In the modified structure illustrated in Figs. 3 and 4 of the drawing, we have shown an additional control for the liquid discharge openings or perforations 21 comprising radially adjustable elbows 43. The horizontal portions of these elbows are adapted to be rotated to different settings and maintained in fixed adjusted position by set screws 45 whereby the flow capacity of these elbows or exit tubes may be varied to permit any degree of discharge and also the desired degree of liquid seal to be maintained.

The feed distribution baffle 23 is an important feature of the invention since it introduces the feed under the separated water column W through the throat 27 in such a manner that the material moves inwardly as it separates and displaces the submerged cake layers causing a portion of the solid content thereof to enter the dry cake zone and prevents the formation of heavy soggy zones in the submerged cake layer. In this manner we are able to operate continuously without the necessity of frequently shutting down to remove collapsed, oil-soaked cake from the centrifuge. As shown in the drawing, the outer periphery of baffle 23 preferably extends into the water layer and radially beyond the discharge openings 21 so that the incoming emulsion feed is discharged between the separated cake C and S and the wall of bowl 13 whereby continuous inward displacement and discharge of the cake are insured. The inner periphery of this baffle preferably extends inwardly sufficiently beyond the inner edge of lip 19 to provide ample support for the separated annular columns of liquid and solid.

Our improved construction enables us to obtain continuous separation and avoids all the operating disadvantages of the ordinary solid bowl centrifuge and of a centrifugal filter. It also permits us to subcool the charge emulsion to a greater extent so that we can make separations heretofore believed impossible in one pass.

It is to be understood that the use of our improved machine is not limited to the separation of wax-oil emulsions, which were used only to illustrate our invention. Our improved centrifuge is applicable to the separation of any liquid-solid mixture having the requisite characteristics of light solid and heavy liquid.

Although we have described several forms of embodiment of our invention, other modifications thereof will be apparent to those skilled in the art, and only the limitations of the claims appended hereinafter should be applied.

We claim:

1. The method of separating a wax-oil mixture wherein such mixture is emulsified in liquid condition with a heavier non-solvent liquid and the resulting emulsion is cooled to partially solidify the wax, which includes continuously introducing said partially solidified emulsion into one end of a solid-bowl centrifugal separator, said end of the separator being closed and said separator having an inwardly extending lip at its other end, said lip being provided with perforations, rotating said separator to cause the emulsion to stratify into non-solvent liquid, oil, and solid wax layers, said layers being named in order of their decreasing radii from the axis of the separator, the rotation of said separator causing the non-solvent liquid and oil layers to discharge through the perforations in the lip and the cake to discharge over the inner edge of the lip by reason of the continuous feed of the emulsion, and causing said emulsion feed to be introduced into the non-solvent liquid layer next to the wall of the separator.

2. The method of separating a wax-oil mixture as defined in claim 1, which includes regulating the relative position of the non-solvent liquid and oil layers with respect to the perforations by introducing into the separator an additional quantity of heavy non-solvent liquid.

3. The method of separating a wax-oil mixture as defined in claim 1, which includes regulating the relative position of the non-solvent liquid and oil layers with respect to the perforations by introducing additional heavy non-solvent liquid into the emulsion feed to the separator.

4. The method of separating a wax-oil mixture as defined in claim 1, which includes regulating the relative position of the non-solvent liquid and oil layers with respect to the perforations by washing the solid wax layer intermediate the ends of the separator with an additional quantity of said heavy non-solvent liquid.

5. The method of separating a wax-oil mixture as defined in claim 1, which includes regulating the relative position of the non-solvent liquid and oil layers with respect to the perforations by controlling the temperature of the heavy non-solvent liquid used to form the emulsion.

6. The method of separating a wax-oil mixture wherein such mixture is emulsified in liquid condition with a heavier non-solvent liquid and the resulting emulsion is cooled to partially solidify the wax, which includes continuously introducing said partially solidified emulsion into one end of a solid-bowl centrifugal separator, said end of the separator being closed and said separator having an inwardly extending lip at its other end, said lip being provided with perforations, and rotating said separator to cause the emulsion to stratify into non-solvent liquid, oil, and solid wax layers, said layers being named in order of their decreasing radii from the axis of the separator, the rotation of said separator causing the non-solvent liquid and oil layers to discharge through the perforations in the lip and the cake to discharge over the inner edge of the lip by reason of the continuous feed of the emulsion.

7. The method of continuously separating a wax-oil mixture wherein such mixture is emulsified in liquid condition with a heavier liquid and the resulting emulsion is cooled to at least partially solidify the wax, which includes continuously introducing said cooled emulsion into one end of a solid-bowl centrifugal separator closed at said end against discharge of the contents of the separator and having at its opposite end an inwardly extending annular lip apertured intermediate its radial width, rotating the separator during said introduction of the emulsion to separate the wax, as an inner stratum, from the liquid contents of the separator, cause discharge of the liquid contents through said apertured lip and cause progressive axial discharge of the wax of said stratum past the inner edge of the lip, introducing additional heavier liquid to the separator, and controlling said introduction of additional liquid to adjust the radial position of the wax stratum, for controlled discharge of the wax and prevention of discharge thereof through the apertured lip.

AUGUST HENRY SCHUTTE.
ARTHUR W. MACK.